United States Patent [19]

Shedigian et al.

[11] Patent Number: 4,626,959

[45] Date of Patent: Dec. 2, 1986

[54] DIELECTRIC FLUID FOR METALLIZED CAPACITORS

[75] Inventors: Vandos Shedigian; Gerald A. Voyles, both of Indianapolis, Ind.

[73] Assignee: Emhart Industries, Inc., Indianapolis, Ind.

[21] Appl. No.: 646,760

[22] Filed: Sep. 4, 1984

[51] Int. Cl.⁴ .................. H01G 3/04; H01G 4/22
[52] U.S. Cl. ............................ 361/315; 252/579
[58] Field of Search .............. 361/433 E, 315, 323; 252/578, 579

[56] References Cited

U.S. PATENT DOCUMENTS

| 3,588,644 | 6/1971 | Nash et al. ............... 252/578 X |
| 4,420,791 | 12/1983 | Shedigian ................ 252/579 X |
| 4,521,826 | 6/1985 | Shedigian et al. ........ 252/579 X |

*Primary Examiner*—Donald A. Griffin
*Attorney, Agent, or Firm*—Robert F. Meyer

[57] ABSTRACT

A dielectric fluid for a metallized polypropylene film capacitor including about 90% to about 100% by volume glycenyl tri (epoxy acetoxystearate) or glyceryl tri (acetoxystearate), each being an ester with about 90% acetostearic acid.

6 Claims, 1 Drawing Figure

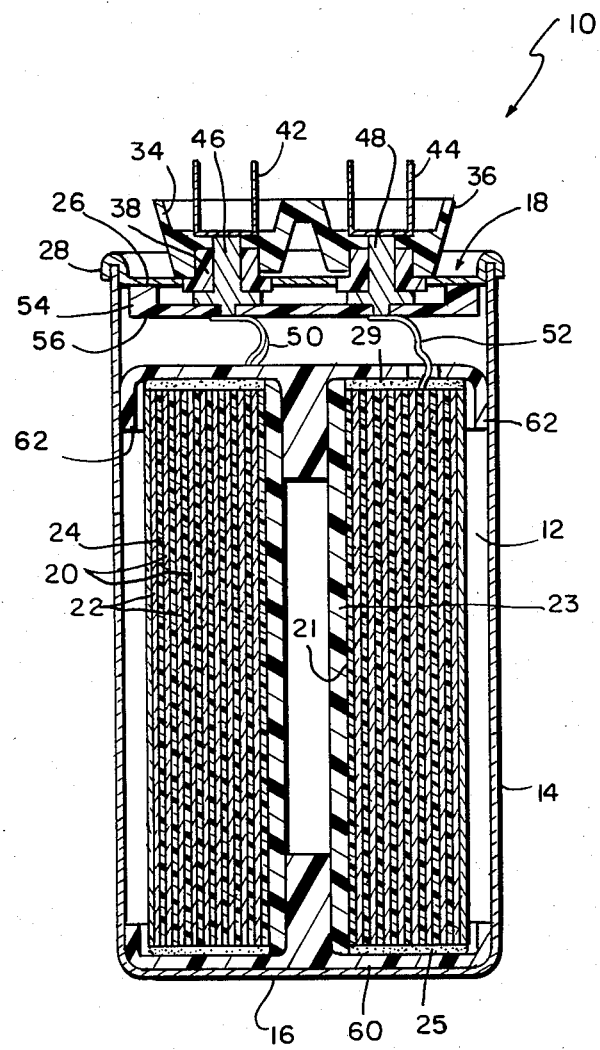

DIELECTRIC FLUID FOR METALLIZED CAPACITORS

This invention relates to dielectric fluids for electrical capacitors, particularly metallized polypropylene film capacitors. The invention more particularly concerns ester type dielectric fluids used in such capacitors.

In the manufacture of self-healing capacitors, the selection of the dielectric fluid has a substantial influence on the electrical characteristics of the capacitor. Self-healing occurs when dielectric breakdown of the metallized electrode occurs locally and the breakdown areas are healed. In other words, insulation of the capacitors is restored by flowing of the metal film portions around the short-circuited metallized films. Under powerful arcing dielectric fluid that has penetrated the film degrades and leads to an increase of the dissipation factor and leads to failure of the capacitors. Thus, in metallized polypropylene capacitors the dielectric fluid should exhibit low swellability of the metallized polypropylene film, high viscosity and high contact angle with the film.

Epoxies have been based as acid scavengers in dielectric fluids for many years. After the banning of the use of polychlorinated biphenyls (PCBs) ester type dielectric fluids have been used. However, the addition of epoxies still continues as an acid scavenger.

For a period of time, there has been a search for suitable substitutes for PCBs. Many kinds of ester type dielectric fluids have been utilized to replace PCBs. These ester type fluids include DOP (dioctyl phthalate), DINP (diisononyl phthalate), and the like. Epoxies have been added to each of these ester type fluids. Epoxies have also been added to hydrocarbon type fluids such as IPB (isopropyl biphenyl) and PXE (phenylxylyl ethane).

It is an object of the present invention to provide a single chemical dielectric fluid which withstands high voltage stress at elevated temperatures and which has a long operative life.

It is another object of the invention to provide a dielectric fluid that exhibits low swellability of the metallized polypropylene film in order to minimize partial discharge or corona and excessive clearing.

It is yet another object of the present invention to provide a dielectric fluid that does not require the addition of epoxies.

It is another object of the present invention to provide a dielectric fluid that exhibits good gas absorption properties.

It is a further object of the present invention to provide a dielectric fluid that has a high oxygen content.

A dielectric fluid in accordance with the present invention includes an ester type material. Preferably, the ester type material is glyceryl tri(epoxy acetoxystearate).

Additionally, a dielectric fluid of the present invention includes butylated hydroxyltoluene (BHT) as an antioxidant.

Other features and advantages of the present invention will be apparent from the following description of a preferred embodiment representing the best mode of carrying out the invention as presently perceived, which description should be considered in conjunction with the accompanying drawings, in which the FIGURE is a cross-sectional view of a capacitor assembly employing the dielectric fluid of the present invention.

In the illustrative embodiment, the dielectric fluid of the present invention includes glyceryl tri(epoxy acetoxystearate). This particular compound produces advantageous results in metallized polypropylene capacitors due to low swelling of polypropylene films, high oxygen content, its ability to absorb gas and high viscosity (2,000 centistokes at 25° C.). These properties are considered favorable for fluids utilized as dielectrics in metallized polyprolylene film capacitors. During clearing the high oxygen content of the dielectric of the present invention prevents the build-up of conductive carbon paths. Additionally the gas absorption properties of the dielectric fluid assures that any gases that evolve are absorbed by the dielectric fluid. The low swelling effect on the polypropylene film restricts loosening of the metallized layer.

A typical metallized polypropylene film capacitor that utilizes the dielectric fluid of the present invention is shown in FIG. 1. The capacitor assembly 10 includes capacitor body 12 which is carried in a container 14 having a bottom 16 and an open end 18. Container 14 may be made of metal or metal alloy, or it may be fabricated of a suitable thermo-plastic material. Capacitor body 12 comprises a plurality of metal electrodes 20 and 22 which are separated by spacers 24. The electrodes 20 and 22 are usually part of the dielectric sheet as a metal layer vacuum deposited thereon. The electrodes in the spacer members are wound tightly to provide an axial center 21 by either winding the electrodes and spacer members on a removable mandrel or on a rigid, hollow core 23. The electrodes and spacers are wound so that electrodes 20 and 22 are offset with respect to each other in order that each roll edge or end displays an offset. Electrical contact is made with electrodes 20 and 22 after they are rolled by spraying the ends of the roll with zinc 25 and 27. Container 14 is then filled with a dielectric fluid of the present invention. Suitable metals would be aluminum or zinc, or a combination of the two. Suitable materials for the dielectric spacers 24 include polymeric films such as polypropylene, MYLAR, teflon, KAPTON, polycarbonate, and polysulfone, preferably polypropylene.

The open end of the container is closed by a lid 26. The lid being sealed into the outer rim 28 of the container by crimping, searing, or other suitable means. The lid contains an opening (not shown) through which a terminal assembly may be inserted. The terminal assembly includes an insulator with cups 34 and 36 which are carried on bushing 38. Terminals 42 and 44 are electrically connected to rivets 46 and 48 which are electrically connected to tabs 50 and 52. Tabs 50 and 52 are electrically connected to electrodes 20 and 22. The assembly also includes an interruptor 54 which in this embodiment includes a plastic disc 56 carried by the rivets 46 and 48.

Capacitor body 12 is anchored within the container 14 through a pair of thin-walled, cup-shaped members 60 and 62. Other suitable means may be used to insulate and hold the capacitor body 12 in the container.

The failure of metallized polypropylene capacitors in AC applications is due primarily to partial discharges or corona and excessive clearing. It has been found that by utilizing the dielectric fluid to occupy the air spaces within the capacitor between the offset electrodes 20, 22 corona is greatly minimized. Another problem is the decrease in capacitance with time attributed to corona-induced electrode erosion. The decrease in capacitance can be retarded or slowed down by tightly winding metallized polypropylene film on solid cores followed by heat stabilization. In a liquid filled tightly wound capacitor it is not desirable to have any liquid penetrate significantly into the roll. Liquid penetration should be limited to the roll edges where significant corona may occur. The dielectric fluid of the present invention achieves these desired results. This is believed to be due to the fact that glyceryl tri(epoxy acetoxystearate) has good gas absorption properties and very low imbibition into polypropylene film. Additionally, the glyceryl tri(epoxy acetoxystearate) has a high oxygen content. These are considered favorable properties for metallized polypropylene film capacitors.

During clearing, oxygen prevents the build-up of conductive carbon paths and all gases evolved during clearing are absorbed by the epoxy rings present in glyceryl tri(epoxy acetoxystearate). The presence of the epoxy groups in the glyceryl tri(epoxy acetoxystearate) also facilitates in neutralizing all chemical and electrical decompositions within the capacitor.

An antioxidant such as butylated hydroxytoluene (BHT) may be added to act as a radical scavenger. It was determined that the preferred percentage of the constituents in the dielectric fluid are approximately about 90% to about 100% glyceryl tri(epoxy acetoxystearate) and about 0.01% to about 10% butylated hydroxytoluene.

A number of metallized polypropylene capacitors rated 440 VAC/15uF (10 microns) were impregnated with a dielectric fluid made in accordance with the present invention i.e. glyceryl tri(epoxy acetoxystearate), which is a triglyceride (ester) of approximately 90% acetostearic acid. These capacitors were life-tested at levels 25% above design stress at 80° C. The life-test capacitors were tested for percentage of capacitance loss after two thousand hours. A number of other metallized polypropylene film capacitors rated at 440 VAC/15uF (10 microns) were impregnated with various other ester type dielectric fluids including glyceryl tri(acetoxystearate) which has about 90% acetostearic acid. These capacitors also were life-tested at levels 25% above design stress at 80° C. The percentage of capacitance loss was determined after two thousand hours. The results of the tests are shown in Table I.

TABLE I

% CAPACITANCE LOSS IN METALLIZED PP FILM CAPACITORS 440 VAC/15uF (10 Microns) on Life Test 550 VAC, 2000 Hrs. at 80° C.

| Fluid | % Capacitance Loss, (C %) |
|---|---|
| Dioctyl Phthalate | 5.3 |
| Diisononyl Phthalate | 4.7 |
| Glyceryl Tri(acetyl Ricinoleate) | 9.0 |
| Hatcol 5170 (Polyol Ester) | 7.8 |
| Glyceryl Tri (acetoxystearate) | 2.1 |
| Glyceryl Tri (Epoxy Acetoxystearate) | 1.3 |

It can be seen that the dielectric fluids with about 90% acetostearic acid i.e. glyceryl tri(epoxy acetoxystearate) and glyceryl tri(acetoxystearate) exhibited a far lower percentage of capacitance loss than any of the other tested ester type dielectric fluids.

Additionally, the percent swellability of polypropylene film was measured in a dielectric solution of the present invention and in various other dielectric solutions at 60° C. and 95° C. In comparison to the various other dielectric solutions, glyceryl tri(epoxy acetoxystearate) and glyceryl tri(acetoxystearate) exhibited far lower percentages of swellability of the polypropylene film than any of the other dielectric fluids. The result of these tests are shown in Table II.

TABLE II

SWELLABILITY OF POLYPROPYLENE FILM

| Fluid | Swellability, Volume % | |
|---|---|---|
| | 60° C. | 95° C. |
| Dioctyl Phthalate | 4.0 | 7.1 |
| Diisononyl Phthalate | 2.8 | 6.6 |
| Glyceryl Tri(Acetyl Ricinoleate) | 0.7 | 2.1 |
| Hatcol 5170 (Polyol Ester) | 1.3 | 4.2 |
| Glyceryl Tri(Acetoxystearate) | 0.3 | 0.9 |
| Glyceryl Tri(epoxy Acetoxystearate) | 0.3 | 0.5 |

All of the results of the tests indicate that the dielectric fluid of the present invention i.e. those including about 90% acetostearic acid produces improved performance in metallized polypropylene film capacitors in comparison to other type esters. It should be noted that the dielectric fluid of the present invention swelled the polypropylene film to a far lesser degree than occurrred with any other dielectric fluids. Because of this decrease in swellability of the polypropylene film when in contact with the fluid of the present invention the loss in capacitance due to prolonged use in such capacitors is greatly decreased. This is believed due in part to the more efficient wrap that may be achieved in such capacitors because of the ability of the dielectric fluid of the present invention to absorb gas during the operation of the capacitors under electrical stress at elevated temperatures.

The above description of the present invention is intended to be taken in an illustrated and not a limiting sense, and various modification and changes may be made to the described embodiments by a person skilled in the art without departing from the scope of the appended claims.

What is claimed is:

1. In a metallized polypropylene film capacitor including a casing containing a capacitor roll section having a pair of spaced apart electrodes, a polypropylene sheet for separating the electrodes, and a dielectric fluid adjacent said electrodes, in said casing, the dielectric fluid comprising about 90% to about 100% by volume of glyceryl tri(epoxy acetoxystearate).

2. The capacitor in claim 1 wherein the dielectric fluid swells the polypropylene film from about 0.3% to about 0.5% by volume dependent on temperature.

3. The capacitor of claim 2 wherein the dielectric fluid includes from about 0% to about 10% andioxidant by weight of dielectric fluid.

4. The capacitor of claim 3 wherein the antioxidant is a butylated hydroxytoluene.

5. A dielectric fluid comprising about 90% to about 100% by volume glyceryl tri(epoxy acetoxystearate).

6. The dielectric fluid of claim 5 including from 0% to about 10% by volume butylated hydroxytoluene.

* * * * *